United States Patent
Kunai (10) Patent No.: US 9,151,983 B2
(45) Date of Patent: Oct. 6, 2015

(54) STRETCHED FILM, POLARIZING STRETCHED FILM, METHOD FOR PRODUCING THE STRETCHED FILM, AND METHOD FOR PRODUCING THE POLARIZING STRETCHED FILM

(75) Inventor: Yuichiro Kunai, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 207 days.

(21) Appl. No.: 13/700,569

(22) PCT Filed: May 25, 2011

(86) PCT No.: PCT/JP2011/062557
§ 371 (c)(1),
(2), (4) Date: Nov. 28, 2012

(87) PCT Pub. No.: WO2011/152436
PCT Pub. Date: Dec. 8, 2011

(65) Prior Publication Data
US 2013/0070186 A1  Mar. 21, 2013

(30) Foreign Application Priority Data
May 31, 2010 (JP) .................. 2010-124256

(51) Int. Cl.
*C09K 19/00* (2006.01)
*G02F 1/1335* (2006.01)
(Continued)

(52) U.S. Cl.
CPC ........ *G02F 1/133528* (2013.01); *B29C 55/023* (2013.01); *B29C 55/04* (2013.01);
(Continued)

(58) Field of Classification Search
CPC . G02F 1/133528; G02F 2201/50; G02B 1/04; G02B 5/30; G02B 5/305; G02B 5/3083; B32B 27/08; B32B 27/32; B32B 27/306; B32B 27/02; B32B 27/04; B32B 2255/10; B32B 2255/26; B32B 2255/242; B29C 55/023; B29C 55/04; Y10T 428/10; Y10T 428/1036; Y10T 428/1041; Y10T 428/105
USPC ........ 428/1.3, 1.31, 1.33, 336, 337, 212, 339, 428/1.1; 349/96; 359/487.02; 264/1.34, 264/134, 291
See application file for complete search history.

(56) References Cited

U.S. PATENT DOCUMENTS

| | | | |
|---|---|---|---|
| 2004/0241481 A1* | 12/2004 | Ichige et al. | 428/515 |
| 2010/0136354 A1 | 6/2010 | Taniguchi et al. | |
| 2010/0202051 A1 | 8/2010 | Yoshimi et al. | |

FOREIGN PATENT DOCUMENTS

| | | |
|---|---|---|
| JP | 2000-338329 A | 12/2000 |
| JP | 2003-043257 A | 2/2003 |

(Continued)

OTHER PUBLICATIONS

Office Action, Sep. 16, 2011, JP2010-124256.
(Continued)

*Primary Examiner* — Ruiyun Zhang
(74) *Attorney, Agent, or Firm* — Hogan Lovells US LLP (57) ABSTRACT

Disclosed are: a stretched film obtained by uniaxially stretching a laminated film which comprises a base film and a polyvinyl alcohol resin layer laminated on one surface of the base film, wherein the base film has a multilayer structure of resin layers including two resin layers which comprise different resins from one another; a polarizing stretched film obtained by imparting polarizing performance to the stretched film; and a method for producing a polarizing plate using the polarizing stretched film. It is preferable that the resins constituting the above-described two resin layers show different phase transition temperatures from one another.

10 Claims, 3 Drawing Sheets

(51) Int. Cl.
　　*B29D 11/00*　　　(2006.01)
　　*B32B 27/08*　　　(2006.01)
　　*G02B 5/30*　　　(2006.01)
　　*B32B 7/02*　　　(2006.01)
　　*B32B 27/30*　　　(2006.01)
　　*B32B 27/32*　　　(2006.01)
　　*B32B 37/02*　　　(2006.01)
　　*B29C 55/02*　　　(2006.01)
　　*B29C 55/04*　　　(2006.01)
　　*B29K 29/00*　　　(2006.01)

(52) U.S. Cl.
　　CPC ...... *B29D11/0073* (2013.01); *B29D 11/00644* (2013.01); *B32B 7/02* (2013.01); *B32B 27/08* (2013.01); *B32B 27/306* (2013.01); *B32B 27/32* (2013.01); *B32B 37/02* (2013.01); *G02B 5/30* (2013.01); *G02B 5/305* (2013.01); *G02B 5/3033* (2013.01); *G02B 5/3083* (2013.01); *B29K 2029/04* (2013.01); *B32B 2250/242* (2013.01); *B32B 2255/10* (2013.01); *B32B 2255/26* (2013.01); *B32B 2307/516* (2013.01); *B32B 2457/00* (2013.01); *B32B 2457/202* (2013.01); *G02F 2201/50* (2013.01); *Y10T 428/10* (2015.01); *Y10T 428/1041* (2015.01); *Y10T 428/24942* (2015.01); *Y10T 428/265* (2015.01); *Y10T 428/31938* (2015.04)

(56)　　　　　References Cited

FOREIGN PATENT DOCUMENTS

| | | |
|---|---|---|
| JP | 2009-093074 A | 4/2009 |
| JP | 2009-220285 A | 10/2009 |
| JP | 2009-242464 A | 10/2009 |
| WO | WO 2008139863 A1 * | 11/2008 |
| WO | WO 2009041383 A1 * | 4/2009 |
| WO | WO2009082131 * | 7/2009 |

OTHER PUBLICATIONS

International Search Report, PCT/JP2011/062557, filed on May 25, 2011.

* cited by examiner

STRETCHED FILM, POLARIZING STRETCHED FILM, METHOD FOR PRODUCING THE STRETCHED FILM, AND METHOD FOR PRODUCING THE POLARIZING STRETCHED FILM

This application is the U.S. National Phase under 35 U.S.C. §371 of International Application PCT Patent Application No. PCT/JP2011/062557, filed on May 25, 2011, which claims priority to Japanese Patent Application No. 2010-124256, filed on May 31, 2010; the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The present invention relates to a stretched film and a polarizing stretched film having a uniaxially stretched polyvinyl alcohol resin layer suitably used for the production of a polarizing plate, and methods for producing them. Further, the present invention relates to a method for producing a polarizing plate using the stretched film or the polarizing stretched film.

BACKGROUND ART

Polarizing plates are widely used as an element to generate polarization and as an element to detect polarization in a liquid crystal display device. Such polarizing plates in which a protective film composed of triacetylcellulose or the like is adhered to one surface or both surfaces of a polarizing film composed of a polyvinyl alcohol resin are conventionally used. Decrease in thickness and weight of polarizing plates has been recently requested in association with the increasing application of liquid crystal display devices to mobile devices such as notebook type personal computers and cellular phones, and further to large size televisions.

For example, JP 2000-338329-A, JP 2009-93074-A, JP 2009-98653-A and JP 2003-43257-A disclose a method for production of a polarizing plate by the use of a stretched film obtained by stretching a resin layer of polyvinyl alcohol resin formed on one surface of a base film comprising a single resin layer, as a method for producing a thin polarizing plate.

In producing a polarizing plate using the conventional stretched film as described-above, however, particularly if the draw ratio of the stretched film used is high, there is a problem of tearing of the film to the stretching direction when rolls, such as nip rolls, wind the film in dying the polyvinyl alcohol resin layer.

An object of the present invention is to provide a stretched film with a uniaxially stretched polyvinyl alcohol resin layer formed on one surface of a base film, the tearing of which to the stretching direction can be successfully restrained in a dying step of producing a polarizing plate or a polarizing stretched film. Another object of the present invention is to provide a polarizing stretched film and a polarizing plate by the use of the polarizing stretched film to which polarizing performance has been imparted.

DISCLOSURE OF THE INVENTION

Namely, the present invention includes the followings:

[1] A stretched film obtained by uniaxially stretching a laminated film which comprises a base film and a polyvinyl alcohol resin layer laminated on one surface of the base film, wherein the base film has a multilayer structure of resin layers including two resin layers which comprise different resins from one another.

[2] The stretched film according to [1], wherein the resins constituting the above-described two resin layers have different phase transition temperatures from one another.

Here, the phase transition temperature means glass transition temperature, Tg when the resin constituting the resin layer is an amorphous resin, and means melting point, Tm when the resin is a crystalline resin.

[3] The stretched film according to [2], wherein the difference between the highest phase transition temperature and the lowest phase transition temperature among the phase transition temperatures of the resins constituting the resin layers in the above-described base film is 10° C. or more.

[4] The stretched film according to any one of [1] to [3], wherein the above-described base film consists of three resin layers.

[5] The stretched film according to [4], wherein any adjacent resin layers in the three resin layers comprise different resins from one another.

[6] The stretched film according to [5], wherein regarding the resin layers constituting the base film, the phase transition temperature of the resin constituting the intermediate layer is lower than those of the resins constituting other resin layers.

[7] The stretched film according to any one of [1] to [6], wherein the above-described two resin layers comprise linear polyolefin resins having different melting points from one another.

[8] The stretched film according to any one of [1] to [7], wherein the above-described base film is the one stretched perpendicular to the stretching direction of the uniaxial stretching of the above-described laminated film within the plane of the film.

[9] The stretched film according to any one of [1] to [8], wherein the thickness of the above-described polyvinyl alcohol resin layer in the stretched film is 10 μm or less.

[10] The stretched film according to any one of [1] to [9], wherein the draw ratio of the above-described laminated film is more than 5.

[11] A polarizing stretched film in which the polyvinyl alcohol resin layer in the stretched film defined in any one of [1] to [10] is a polarizer layer in which dichroic dye has been adsorbed and oriented in the polyvinyl alcohol resin layer.

[12] A method for producing the stretched film defined in any one of [1] to [10], which comprises a step of obtaining a laminated film by forming a polyvinyl alcohol resin layer on one surface of the above-described base film, and a step of uniaxially stretching the laminated film.

[13] The method for producing the stretched film according to [12], wherein the above-described laminated film is uniaxially stretched to a draw ratio of more than 5.

[14] A method for producing the polarizing stretched film defined in [11], which comprises a step of obtaining a laminated film by forming a polyvinyl alcohol resin layer on one surface of the above-described base film, a step of obtaining a stretched film by uniaxially stretching the laminated film, a step of obtaining a dyed film by dyeing the polyvinyl alcohol resin layer of the stretched film with a dichroic dye, a step of obtaining a cross-linked film by immersing the polyvinyl alcohol resin layer of the dyed film in a solution containing a cross-linking agent to form a polarizer layer, and a step of drying the cross-linked film.

[15] The method for producing the polarizing stretched film according to [14], wherein the above-described laminated film is uniaxially stretched to a draw ratio of more than 5.

[16] A method for producing a polarizing plate, which comprises a step of laminating a protective film on a surface of the polarizer layer of the polarizing stretched film defined in [11], wherein the surface is located opposite from the base film, and a step of peeling and removing the base film.

[17] A liquid crystal display device comprising a liquid crystal cell and the polarizing stretched film defined in [11] or produced by the method defined in [14], and laminated on at least one surface of the liquid crystal cell.

[18] A liquid crystal display device comprising a liquid crystal cell and the polarizing plate produced by the method defined in [16], and laminated on at least one surface of the liquid crystal cell.

[19] An unstretched laminated film that comprises a base film and a polyvinyl alcohol resin layer having a thickness of 3 to 30 μm and laminated on one surface of the base film, wherein the base film has a multilayer structure of resin layers including two resin layers which comprise different resins from one another.

[20] The laminated film according to [19], wherein the resins constituting the above-described two resin layers have different phase transition temperatures from one another.

The phase transition temperature used here has the same meaning as described above.

[21] The laminated film according to [20], wherein the difference between the highest phase transition temperature and the lowest phase transition temperature among phase transition temperatures of the resins constituting the resin layers in the base film is 10° C. or more.

[22] The laminated film according to any one of [18] to [20], wherein the above-described base film consists of three resin layers.

[23] The laminated film according to [22], wherein any adjacent resin layers in the three resin layers comprise different resins from one another.

[24] The laminated film according to [22] or [23], wherein regarding the resin layers constituting the base film, the phase transition temperature of a resin constituting an intermediate layer is lower than those of resins constituting other resin layers.

[25] The laminated film according to any one of [19] to [24], wherein the above-described two resin layers comprise linear polyolefin resins having different melting points from one another.

According to the present invention, provided is a stretched film which is thin, and the tearing of which to the stretching direction can be successfully refrained in a dyeing step in producing a polarizing plate and a polarizing stretched film. The stretched film of the present invention is extremely effective as an intermediate (intermediate article) for producing a polarizing plate and a polarizing stretched film, and by using the stretched film of the present invention, a polarizing plate and a polarizing stretched film can be produced stably with high yield.

Further, the polarizing stretched film and the polarizing plate according to the present invention can be suitably applied to liquid crystal display devices used in mobile terminals and the like since the film and the plate have been thinned.

MODES FOR CARRYING OUT THE INVENTION

<Stretched Film>

Figure 1:
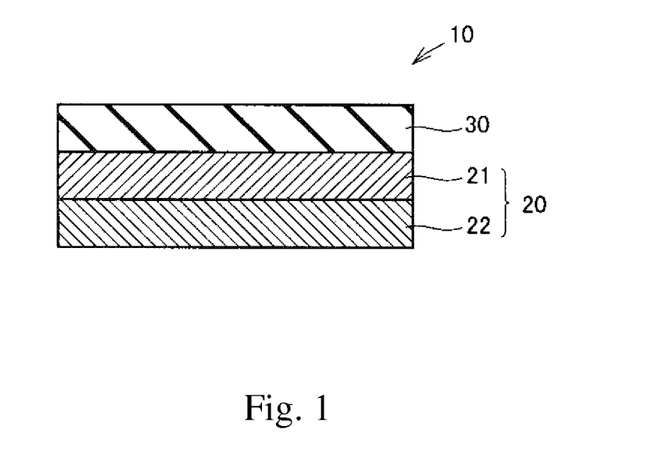
FIG. 1 is a schematic cross-sectional view illustrating one preferable example of the stretched film of the present invention.
Figure 2:
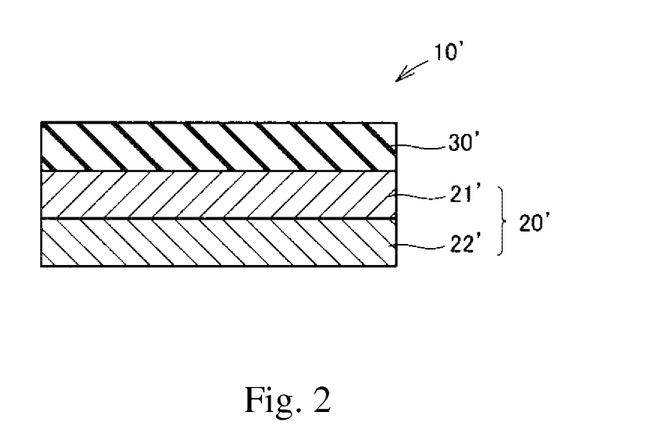
FIG. 2 is a schematic cross-sectional view illustrating one preferable example of the laminated film of the present invention.

FIG. 1 is a schematic cross-sectional view illustrating one preferable example of the stretched film of the present invention. The stretched film 10 shown in FIG. 1 has a uniaxially stretched base film 20 and a uniaxially stretched polyvinyl alcohol resin layer 30 laminated on one surface of this base film 20. That is, the stretched film 10 is obtained by uniaxially stretching a laminated film 10' having a base film 20' and a polyvinyl alcohol resin layer 30' laminated on one surface of the base film 20' as shown in FIG. 2. In the laminated film 10', the base film 20' has a multilayer structure of resin layers, and in this example, consists of two resin layers: a first resin layer 21' and a second resin layer 22'. Likewise, the uniaxially stretched base film 20 has a multilayer structure of resin layers, and in this example, consists of two resin layers: a first resin layer 21 and a second resin layer 22. The first resin layer 21 and the second resin layer 22 (the first resin layer 21' and the second resin layer 22') comprise different resins from one another. Here, the term "different resins from one another" means that when two resin layers are laminated, one layer is distinguished from another layer by their resins, for example, which denotes that layers are different in kind of the resin, proportion of constituent unit of the resin, degree of polymerization, physical properties of the resin, and the like. The two resin layers preferably comprise resins having different phase transition temperatures from one another. The "phase transition temperature" used here means glass transition temperature Tg when the resin constituting the resin layer is an amorphous resin, and means melting point (crystal melting point) Tm when the resin is a crystalline resin, and both are measured according to JIS K 7121.

Thus, the stretched film of the present invention is characterized by a base film including two resin layers which comprise different resins from one another, preferably, having different phase transition temperatures from one another. This can effectively improve a resistance against tearing to the stretching direction in dyeing step in producing a polarizing plate and a polarizing stretched film using a stretched film having a polyvinyl alcohol resin layer. That is, in the case of uniaxial stretching of a laminated film having a polyvinyl alcohol resin layer formed on a base film which comprises a single resin layer as before, the uniaxial stretching is usually conducted at a temperature around the phase transition temperature of a resin constituting the base film (resin layer) (glass transition temperature Tg in the case of an amorphous resin, melting point Tm in the case of a crystalline resin) on the grounds that excessively low stretching temperature leads to low flowability of the base film, which tends to cause tearing of the base film, and that excessively high stretching temperature leads to melting of the base film, which makes the base film impossible to be stretched. However, if a uniaxial stretching treatment is carried out at around the phase transition temperature, uniaxial orientation to the stretching direction occurs not only in the polyvinyl alcohol resin layer but also in the base film and, thus, the stretched film as well as the base film tends to be torn to the stretching direction. By contrast, in the case of the stretched film of the present invention using a base film having a multilayer structure of plural resin layers as described above, if the uniaxial stretching temperature of the laminated film is set at around the highest phase transition temperature among the phase transition temperatures of the resins constituting plural resin layers, layers other than the resin layer having the highest phase transition temperature are molten during stretching and, thus, are not uniaxially oriented (or scarcely oriented) and therefore excellent in strength (resistance against tearing to the stretching direction). Further, since the resin layer comprising the resin having the highest phase transition temperature plays a role of a support, even if other resin layers are molten during stretching, its shape can be kept and melting out thereof does not occur. As described above, the stretched film of the present invention is endowed with a resistance against tearing to the stretching direction owing to the resin layer with no orientation by uniaxial stretching. The stretched film of the present invention is extremely effective as an intermediate (intermediate article) for producing a polarizing plate and a polarizing stretched film.

In the stretched film of the present invention, the base film is capable of containing three or more resin layers. In the three resin layers, resin layers adjacent directly or via an adhesive layer preferably comprise different resins from one another.

Figure 3:
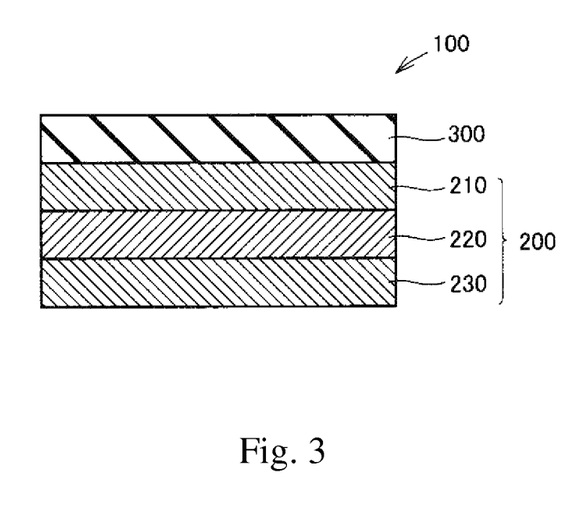
FIG. 3 is a schematic cross-sectional view illustrating another preferable example of the stretched film of the present invention.

FIG. 3 is a schematic cross-sectional view illustrating another preferable example of the stretched film of the present invention. The stretched film 100 shown in FIG. 3 has a uniaxially stretched base film 200 having a three-layer structure comprising a first resin layer 210, a second resin layer 220 and a third resin layer 230, and a uniaxially stretched polyvinyl alcohol resin layer 300 laminated on one surface of this base film 200.

In the case of using the base film 200 having such a three-layer structure, preferably, the resin constituting the first resin layer 210 and the resin constituting the third resin layer 230 are the same resin and a resin different from this is used in the second resin layer 220. By such a symmetric structure, can be restrained curl of the base film potentially to occur in the case of a two-layer structure of the base film, and handling thereof can be improved.

The stretched film of the present invention will be described further in detail below.

(Base Film)

The base film constituting the stretched film of the present invention is uniaxially stretched as described above, and capable of containing three or more resin layers comprising different resins from one another, preferably including two resin layers having different phase transition temperatures from one another. Plural resin layers constituting the base film each may comprise an amorphous resin or a crystalline resin.

Namely, the base film may comprise a combination of only resin layers of amorphous resin, a combination of only resin layers of crystalline resin, or a combination of a resin layer of an amorphous resin and a resin layer of a crystalline resin.

It is preferable that the base film contains two resin layers having different phase transition temperatures from one another.

In this structure, resistance against tearing to the stretching direction of a stretched film can be improved by conducting uniaxial stretching of a laminated film at around the highest phase transition temperature among the phase transition temperatures of the resins constituting plural resin layers as described above since the uniaxial stretching makes the laminated film have a resin layer with no uniaxial orientation irrespective of generation of orientation of the resin layer having the highest phase transition temperature.

When the difference between the highest phase transition temperature and the lowest phase transition temperature among the phase transition temperatures of the resins constituting plural resin layers of the base film is larger, the resin layer comprising the resin having the lowest phase transition temperature melts more easily during conducting uniaxial stretching of a laminated film at around the highest phase transition temperature and, thus, occurrence of orientation of the resin layer is more restrained and resistance against tearing to the stretching direction of the stretched film can be improved more. From such a standpoint, the above-described difference between the highest phase transition temperature and the lowest phase transition temperature is preferably 10° C. or more, more preferably 20° C. or more. On the other hand, when this difference is extremely large, there is a possibility of lowering in the handling of a laminated film and in heat resistance in uniaxial stretching thereof and, thus, the difference is preferably 100° C. or less.

The phase transition temperature of each resin constituting each resin layer of the base film (glass transition temperature Tg in the case of an amorphous resin, melting point Tm in the case of a crystalline resin) is preferably 25° C. or higher, more preferably 40° C. or higher from the standpoint of the handling of the base film.

From the standpoint of the heat resistance of a laminated film in uniaxial stretching, the phase transition temperature of each resin is preferably 60° C. or higher, more preferably 80° C. or higher. On the other hand, the phase transition temperature of each resin is preferably 250° C. or lower, more preferably 200° C. or lower. Since it is necessary to raise the temperature up to the highest phase transition temperature for conducting uniaxial stretching of a laminated film, if a resin layer having a phase transition temperature of more than 250° C. is present, there is a possibility of occurrence of thermal degradation of a polyvinyl alcohol resin layer when the temperature is raised up to around the highest phase transition temperature. The kinds (phase transition temperatures) of resins constituting resin layers are preferably selected so that the difference between the highest phase transition temperature and the lowest phase transition temperature may fall within the above-described range.

When the base film consists of three resin layers as shown in FIG. 3, it is preferable that a resin having lower phase transition temperature is used as the resin constituting an intermediate resin layer while a resin having higher phase transition temperature is used in outer two layers. By placing a resin layer which is to be molten in uniaxial stretching of a laminated film at an intermediate position, the molten resin layer can be successfully supported by two outer layers, and the heat resistance of the laminated film in uniaxial stretching can be improved. When the base film consists of two resin layers as shown in FIG. 1, it is preferable that a resin layer comprising a resin having lower phase transition temperature is placed at the side closer to a polyvinyl alcohol resin layer, from the same standpoint.

It is preferable that the resins constituting plural resin layers of the base film are selected so as to satisfy the above-described relation of phase transition temperatures. Further, these resins are preferably thermoplastic resins excellent in transparency, mechanical strength, thermal stability, stretchability, and so on. Specific examples of such thermoplastic resins are cellulose ester resins such as cellulose triacetate; polyester resins; polyether sulfone resins; polysulfone resins; polycarbonate resins; polyamide resins; polyimide resins; polyolefin resins such as linear polyolefin resins and cyclic polyolefin resins (norbornene resin, etc.); (meth)acrylic resins; polyarylate resins; polystyrene resins; polyvinyl alcohol resins; and mixtures thereof. Particularly, it is preferable that the base film contains a resin layer comprising at least one resin selected from the group consisting of cellulose ester resins, linear polyolefin resins, cyclic polyolefin resin and (meth)acrylic resins, because of excellent smoothness for applying a polyvinyl alcohol resin, excellent stretchability of a laminated film with a polyvinyl alcohol resin layer, and so on.

The cellulose ester resin is an ester of cellulose and a fatty acid. Specific examples of the cellulose ester resin are cellulose triacetate, cellulose diacetate, cellulose tripropionate, and cellulose dipropionate. Out of them, cellulose triacetate is particularly preferable. As cellulose triacetate, a variety of products are commercially available and advantageous also from the standpoint of easier availability and lower cost. Examples of commercially available products of cellulose triacetate are "FUJITAC TD80" (produced by FUJIFILM Corporation), "FUJITAC TD80UF" (produced by FUJIFILM Corporation), "FUJITAC TD80UZ" (produced by FUJIFILM Corporation), "FUJITAC TD40UZ" (produced by FUJIFILM Corporation), "KC8UX2M" (produced by KONICA MINOLTA OPTO, INC.), and "KC4UY" (produced by KONICA MINOLTA OPTO, INC.) (all are trade names).

The linear polyolefin resin includes homopolymers such as polyethylene resins, and polypropylene resins, and additionally, copolymers composed of two or more linear olefins.

Cyclic polyolefin resin is a generic name for resins produced by polymerizing a cyclic olefin as a polymerization unit, and includes resins described in, for example, JP H01-240517-A, JP H03-14882-A, and JP H03-122137-A. Specific examples of the cyclic polyolefin resin are ring-opened (co) polymers of cyclic olefins, addition polymers of cyclic olefins, copolymers of a cyclic olefin with a linear olefin such as ethylene and propylene(typically, random copolymers), graft polymers obtained by modifying these with an unsaturated carboxylic acid or its derivatives, and hydrides of them. Out of them, norbornene resins using norbornene monomers such as norbornene and polycyclic norbornene monomers as a cyclic olefin are preferably used.

As the cyclic polyolefin resin, various products are commercially available. Examples of commercially available products of the cyclic polyolefin resins are "Topas" (produced by TOPAS ADVANCED POLYMERS GmbH, available from Polyplastics Co., Ltd.), "ARTON" (produced by JSR), "ZEONOR" (produced by Zeon Corporation), "ZEONEX" (produced by Zeon Corporation) and "APEL" (produced by Mitsui Chemicals, Inc.) (all are trade names).

As the (meth)acrylic resin, any suitable (meth)acrylic resins can be adopted. Examples thereof include poly(meth) acrylates such as polymethyl methacrylate, methyl methacrylate-(meth)acrylic acid copolymers, methyl methacrylate-(meth) acrylate copolymers, methyl methacrylate-acrylate-(meth) acrylic acid copolymers, methyl (meth)acrylate-styrene copolymers (MS resin, etc.), polymers having an alicyclic hydrocarbon group (for example, methyl methacrylate-cyclohexyl methacrylate copolymer and methyl methacrylate-norbornyl (meth)acrylate copolymer).

Preferably, polyalkyl (meth)acrylates having an alkyl portion comprising 1 to 6 carbon atoms such as polymethyl (meth)acrylate are used, and more preferably, methyl methacrylate resins containing methyl methacrylate as the main component (50 to 100 wt %, preferably 70 to 100 wt %) are used.

Plural resin layers constituting a base film are all composed preferably of linear polyolefin resins, more preferably of polypropylene resins (a polypropylene resin as a homopolymer of propylene, a copolymer composed mainly of propylene, etc.), polyethylene resins (a polyethylene resin as a homopolymer of ethylene, a copolymer composed mainly of ethylene, etc.), or the like, because of their excellent stretchability and easiness of adjustment of phase transition temperature among the above-described thermoplastic resins.

The linear polyolefin resin is often crystalline, and the polypropylene resin as a homopolymer of propylene has a melting point Tm in the range of about 150 to about 180° C. In the case of the polyethylene resin as a homopolymer of ethylene, the melting point Tm thereof is variable depending on its density, etc., and is in the range of about 100 to about 140° C. Further, for example, polypropylene resins prepared by copolymerizing propylene with other monomer such as ethylene are capable of having lower melting point than the melting point of a propylene homopolymer. As described above, the phase transition temperature of a resin can be controlled by selecting the kind of the main monomer, the presence or absence and the kinds of a copolymerization component and by adjusting the content thereof, etc.

Examples of the other monomer copolymerizable with propylene are ethylene and α-olefins. As the α-olefin, α-olefins having 4 or more carbon atoms are preferably used, and α-olefins having 4 to 10 carbon atoms are more preferable. Specific examples of the α-olefin having 4 to 10 carbon atoms are linear monoolefins such as 1-butene, 1-pentene, 1-hexene, 1-heptene, 1-octene, and 1-decene; branched monoolefins such as 3-methyl-1-butene, 3-methyl-1-pentene, and 4-methyl-1-pentene; and vinylcyclohexane. The copolymer composed of propylene and the other monomer copolymerizable therewith may be either a random copolymer or a block copolymer. The content of constituent units derived from the other monomer in the copolymer can be determined by infrared (IR) spectrum measurement according to the method described in "Polymer Analysis Handbook" (1995, published by Kinokuniya Bookstore), p. 616.

Out of them, a propylene homopolymer, a propylene-ethylene random copolymer, a propylene-1-butene random copolymer and a propylene-ethylene-1-butene random copolymer are preferably used as the propylene resin.

It is preferable that the stereoregularity of the propylene resin is substantially isotactic or substantially syndiotactic. A base film containing a resin layer composed of a propylene resin having substantially isotactic or substantially syndiotactic stereoregularity has relatively good handling and is excellent in mechanical strength under high temperature circumstances.

To the base film, any suitable additives may have been added, in addition to the above-described thermoplastic resins. Examples of such additives include ultraviolet absorbers, antioxidants, lubricants, plasticizers, releasing agents, coloration inhibitors, flame retardants, nucleating agents, antistatic agents, pigments, and coloring agents. The content of the thermoplastic resin exemplified above in the base film is preferably 50 to 100 wt %, more preferably 50 to 99 wt %, further preferably 60 to 98 wt %, particularly preferably 70 to 97 wt %. When the content of the thermoplastic resin in the base film is less than 50 wt %, high transparency and the like originally owned by the thermoplastic resin are possibly not manifested sufficiently.

The base film in the laminated film may have been stretched in advance in the direction perpendicular to the uniaxial stretching direction of the laminated film within the plane of the film. "Stretching in the direction perpendicular to the uniaxial stretching direction within the plane of the film" means, for example, lateral stretching (stretching to the film width direction) in the case where uniaxial stretching of the laminated film is carried out to the film conveyance direction (the longer direction of the laminated film), namely, to the longitudinal direction.

While the thickness (before stretching) of the base film in the laminated film is not particularly limited, it is preferably 1 to 500 μm, more preferably 1 to 300 μm, further preferably 5 to 200 μm and most preferably 5 to 150 μm from the standpoint of its strength and workabilities such as its handling. The thickness of the uniaxially stretched base film of the stretched film is usually 1 to 300 μm, preferably 1 to 100 μm when the thickness of the laminated film is within the above-described range. The thickness of each resin layer constituting the laminated film and the stretched film is not also particularly restricted and the thickness of a resin layer having no orientation in the stretched film (that is, the molten resin layer in stretching, such as a resin layer with the lowest phase transition temperature) is preferably 2 μm or more, more preferably 5 μm or more to impart sufficient resistance against tearing to the stretching direction to the stretched film. When the base film has a tree-layer structure as shown in FIG. 3, it is preferable that two outer layers have equal thicknesses so that the layer structure may be symmetric.

Plural resin layers contained in the base film of the present invention are laminated directly or laminated via an adhesive layer, and for example, can be easily fabricated by co-extrusion molding using a multi-layer extruding machine, or the like.

A corona treatment, a plasma treatment, a flame treatment and the like may be carried out at least on the surface of the base film where polyvinyl alcohol resin layer is to be formed, for improving adhesion to the polyvinyl alcohol resin layer.
(Polyvinyl Alcohol Resin Layer)

The polyvinyl alcohol resin layer constituting the stretched film of the present invention has been uniaxially stretched as described above, and is on one surface of the base film. Examples of the polyvinyl alcohol resin forming the polyvinyl alcohol resin layer are polyvinyl alcohol resins and derivatives thereof. The derivatives of polyvinyl alcohol resins include polyvinylformal and polyvinylacetal, and additionally, those obtained by modifying polyvinyl alcohol resins with an olefin such as ethylene and propylene, with an unsaturated carboxylic acid such as acrylic acid, methacrylic acid, crotonic acid, with an alkyl ester of an unsaturated carboxylic acid, an acrylamide, or the like. Out of the above-described polyvinyl alcohol resin materials, polyvinyl alcohol resins are preferably used.

The polyvinyl alcohol resin has an average degree of polymerization of preferably 100 to 10000, more preferably 1000 to 10000. When the average degree of polymerization is less than 100, it is difficult to obtain a preferable polarizing property. When it is more than 10000, its solubility in water deteriorates and formation of a polyvinyl alcohol resin layer becomes difficult. The polyvinyl alcohol resin has an average degree of saponification of preferably 80 to 100 mol %, more preferably 98 mol % or more. When the average degree of saponification is less than 80 mol %, it is difficult to obtain a preferable polarizing property.

In the above-described polyvinyl alcohol resin, if necessary, additives such as plasticizers and surfactants may have been added. As the plasticizer, polyols and condensates thereof and the like can be used, and for example, glycerin, diglycerin, triglycerin, ethylene glycol, propylene glycol, and polyethylene glycol are noted. While the blended amount of the additive is not particularly restricted, it is suitably adjusted to 20 wt % or less in the polyvinyl alcohol resin.

The thickness of the polyvinyl alcohol resin layer in the laminated film is preferably 3 μm or more and 30 μm or less, more preferably 5 μm or more and 20 μm or less. When the thickness is less the 3 μm, its thickness after stretching becomes excessively thin and its dyeing characteristics deteriorate remarkably, whereas when more than 30 μm, the thickness of a polarizing plate becomes excessively thick unfavorably. For the same reason, the thickness of the uniaxially stretched polyvinyl alcohol resin layer in the stretched film is preferably 1 μm to 10 μm, more preferably 2 μm to 8 μm.

As described later, the formation of the polyvinyl alcohol resin layer in the laminated film can be conducted by applying a polyvinyl alcohol resin solution directly on one surface of a base film and drying the applied solution, and in this case, a thin layer such as a primer layer may be formed on the surface of the base film to improve adhesion between the polyvinyl alcohol resin layer and the base film. The polyvinyl alcohol resin layer can also be formed by laminating a film of a polyvinyl alcohol resin on a base film, and in this case, an adhesive can be used for bonding between the films.

The polyvinyl alcohol resin layer in the stretched film is the one having been uniaxially oriented to the stretching direction. For example, the polyvinyl alcohol resin layer can be peeled from a base film and the oriented condition of the resin layer can be measured by using a commercially available automatic birefringence measurement device (manufactured by Oji Scientific Instruments: KOBAR-WPR) or the like. When a base film cannot be peeled, the base film can be removed using an organic solvent which only dissolves the base film to isolate the polyvinyl alcohol resin layer and the oriented condition thereof can be measured by the same manner.
<Production Method of Stretched Film>

The stretched film of the present invention can be fabricated by uniaxially stretching a laminated film comprising a base film and a polyvinyl alcohol resin layer laminated on one surface of the base film. That is, the method of producing a stretched film of the present invention includes the following steps:

(a) A step of obtaining a laminated film by forming a polyvinyl alcohol resin layer on one surface of a base film.

(b) A step of uniaxially stretching the laminated film.

In the above-described step (a), the polyvinyl alcohol resin layer is formed preferably by applying a polyvinyl alcohol resin solution prepared by dissolving a powder of a polyvinyl alcohol resin in a good solvent, on one surface of a base film and drying the applied solution to evaporate the solvent.

By such a method, the polyvinyl alcohol resin layer formed can be thin. The method of applying a polyvinyl alcohol resin solution on a base film can be appropriately selected from known methods such as a wire bar coating method, roll coating methods such as reverse coating and gravure coating, a spin coating method, a screen coating method, a fountain coating method, a dipping method and a spray method. The drying temperature is, for example, 50 to 200° C., preferably 60 to 150° C. The drying time is, for example, 5 to 30 minutes.

A primer layer may have been formed on the surface of a base film on the side where a polyvinyl alcohol resin layer is to be formed, before the formation of the polyvinyl alcohol resin layer for the purpose of improving adhesion. The primer layer can be formed, for example, by applying a solution containing a polyvinyl alcohol resin and a cross-linking agent and drying this by the same method as described above.

The polyvinyl alcohol resin layer can also be formed by laminating a film of a polyvinyl alcohol resin on one surface of a base film, as described above.

The above-described step (b) is a step of uniaxially stretching a laminated film comprising a base film and a polyvinyl alcohol resin layer. The draw ratio of the laminated film can be appropriately adjusted depending on the polarizing property requested, and is preferably more than 5 and not more than 17, more preferably more than 5 and not more than 8 with respect to the original length of the laminated film. When the draw ratio is not more than 5, a polyvinyl alcohol resin layer is not sufficiently oriented, and resultantly, the degree of polarization of a polarizing film does not rise sufficiently. On the other hand, when the draw ratio is more than 17, the laminated film tends to break in stretching and simultaneously, the thickness of the laminated film becomes thinner than required, and the processability and the handling thereof possibly deteriorate in the subsequent step. In the present invention, the resultant stretched film has a high resistance against tearing to the stretching direction even if the draw ratio is more than 5, since a base film comprising plural resin layers as described above is used. Therefore, according to the present invention, a polarizing plate and a polarizing stretched film being capable of showing a high polarizing property and having high durability can be provided.

The uniaxial stretching treatment is not limited to one-stage stretching and can also be carried out in multiple stages. In this case, it is preferable that the stretching treatment is carried out so that the sum of the draw ratio in all stages of the stretching treatment may be more than 5.

The uniaxial stretching in the present invention is preferably longitudinal stretching carried out to the longer direction of a laminated film (film conveyance direction). As the longitudinal stretching mode, an inter-roll stretching method, a compression stretching method, a stretching method using a tenter, and the like are noted. The uniaxial stretching is not limited to a longitudinal stretching treatment, and an inclined stretching treatment or the like may also be used.

As the stretching treatment, any of a wet stretching method and a dry stretching method can be adopted, and the use of a dry stretching method is preferable since the temperature in stretching a laminated film can be set in a wider range.

The stretching temperature is usually set at around the highest phase transition temperature among the phase transition temperatures of the resins constituting plural of resin layers of a base film and specifically, a range of (highest phase transition temperature −30° C.) to (highest phase transition temperature +5° C.) is preferable, and a range of (highest phase transition temperature −25° C.) to (highest phase transition temperature) is more preferable. When the stretching temperature is lower than (highest phase transition temperature −30° C.), stretching at a high ratio of more than 5 is difficult. When the stretching temperature is higher than (highest phase transition temperature +5° C.), the flowability of a base film is excessively high and stretching tends to be difficult. The stretching temperature is within the above-described range and further preferably 120° C. or higher. It is because, when the stretching temperature is 120° C. or higher, the stretching treatment is not accompanied by difficulty irrespective of a high draw ratio of more than 5. The temperature of the stretching treatment is usually adjusted by controlling the temperature of a heating furnace.

<Polarizing Stretched Film and Production Method Thereof>

Figure 4:
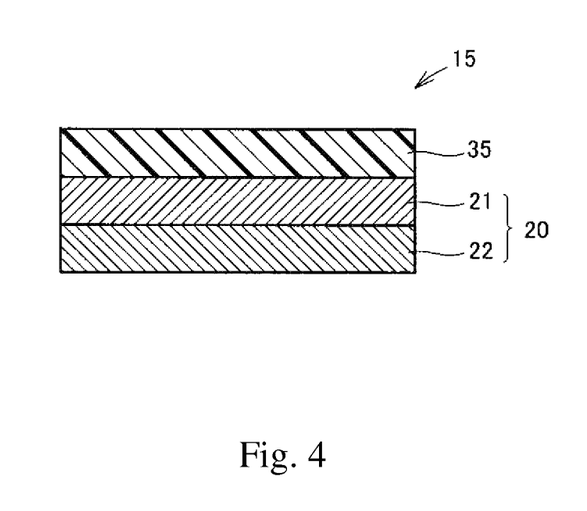
FIG. 4 is a schematic cross-sectional view illustrating one preferable example of the polarizing stretched film of the present invention.

FIG. 4 is a schematic cross-sectional view illustrating one preferable example of the polarizing stretched film of the present invention. The polarizing stretched film 15 shown in FIG. 4 has a uniaxially stretched base film 20 and a polarizer layer 35 composed of a uniaxially stretched polyvinyl alcohol resin layer in which a dichroic dye has been adsorbed and oriented, laminated on one surface of this base film 20. Namely, the polarizing stretched film 15 shown in FIG. 4 is obtained by adsorption and orientation of a dichroic dye in the polyvinyl alcohol resin layer 30 in the stretched film 10 shown in FIG. 1. The polarizing stretched film of the present invention shows a polarizing property since a dichroic dye has been adsorbed and oriented therein, accordingly, this can be used as a polarizing plate, or can be utilized also as an intermediate to a polarizing plate having a protective film. While FIG. 4 illustrates an example of the base film having a two-layer structure, the base film is not limited to this and can also comprise three or more resin layers like the above-described stretched film. The polarizing stretched film of the present invention is thin and simultaneously excellent in a polarizing performance and durability. Further, a liquid crystal display device using the polarizing stretched film of the present invention as a polarizing plate shows high contrast ratio.

The polarizing stretched film of the present invention can be fabricated efficiently using the above-described stretched film, and specifically, can be fabricated by a method including the following steps:

(a') A step of obtaining a laminated film by forming a polyvinyl alcohol resin layer on one surface of a base film.

(b') A step of obtaining a stretched film by uniaxially stretching the laminated film.

(c') A step of obtaining a dyed film by dyeing the polyvinyl alcohol resin layer of the stretched film with a dichroic dye.

(d') A step of obtaining a cross-linked film by immersing the polyvinyl alcohol resin layer of the dyed film in a solution containing a cross-linking agent to form a polarizer layer.

(e') A step of drying the cross-linked film.

Explanations of the above-described steps (a') and (b') are omitted since these are the same as the above-described steps (a) and (b). The above-described step (c') is a step of dyeing the polyvinyl alcohol resin layer of the stretched film with a dichroic dye and making the dye to be adsorbed and oriented. As the dichroic dye, for example, iodine and organic dyes are noted. As the organic dye, for example, Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black can be used. Such dichroic substances may be used singly or in combination.

The dyeing step can be conducted, for example, by immersing the whole body of a stretched film into a solution containing the above-described dichroic dye (dyeing solution). As the dyeing solution, a solution prepared by dissolving the above-described dichroic dye in a solvent can be used. As the solvent of the dyeing solution, water is used in general, and an organic solvent compatible with water may be further added. The concentration of the dichroic dye is preferably 0.01 to 10 wt %, more preferably 0.02 to 7 wt %, particularly preferably 0.025 to 5 wt %.

In the case of using iodine as the dichroic dye, it is preferable to add an iodide further to a dyeing solution containing iodine since the dyeing efficiency can thereby be further improved. Examples of the iodide include potassium iodide, lithium iodide, sodium iodide, zinc iodide, aluminum iodide, lead iodide, copper iodide, barium iodide, calcium iodide, tin iodide, and titanium iodide. The concentration of the iodide in the dyeing solution is preferably 0.01 to 10 wt %. Out of the iodides, potassium iodide is preferably added. In the case of adding potassium iodide, the proportion by weight of iodine to potassium iodide is preferably in the range of 1:5 to 1:100, more preferably in the range of 1:6 to 1:80, particularly preferably in the range of 1:7 to 1:70.

While the time of immersing a stretched film into the dyeing solution is not particularly restricted, it is preferably in the range of 15 seconds to 15 minutes, more preferably 1 minute to 3 minutes. The temperature of the dyeing solution is preferably in the range of 10 to 60° C., more preferably in the range of 20 to 40° C.

While the dyeing step can be carried out before the uniaxial stretching step or simultaneously with the uniaxial stretching step, it is preferable that the dyeing step is carried out after applying the uniaxial stretching step to a laminated film so that the dichroic dye adsorbed in the polyvinyl alcohol resin layer can be successfully oriented.

The above-described step (d') is a step of applying a cross-linking treatment to the polyvinyl alcohol resin layer of the dyed film obtained by dyeing with a dichroic dye, thereby obtaining a cross-linked film having the polyvinyl alcohol resin layer as a polarizer layer. The cross-linking step can be conducted, for example, by immersing a dyed film into a solution containing a cross-linking agent (cross-linking solution). As the cross-linking agent, conventionally known substances can be used. Examples thereof include boron compounds such as boric acid and borax, glyoxal, and glutaraldehyde. Such substances may be used singly or in combination.

As the cross-linking solution, a solution prepared by dissolving a cross-linking agent in a solvent can be used. As the solvent, for example, water can be used, and further, an organic solvent compatible with water may be contained. The concentration of the cross-linking agent in the cross-linking solution is preferably in the range of 1 to 10 wt %, more preferably 2 to 6 wt %.

In the cross-linking solution, an iodide may be added. By addition of an iodide, a polarization property in a plane of a polarizer layer can be more uniform. Examples of the iodide include potassium iodide, lithium iodide, sodium iodide, zinc iodide, aluminum iodide, lead iodide, copper iodide, barium iodide, calcium iodide, tin iodide and titanium iodide. The content of the iodide is preferably 0.05 to 15 wt %, more preferably 0.5 to 8 wt %.

The time of immersing a dyed film into the cross-linking solution is preferably 15 seconds to 20 minutes, more preferably 30 seconds to 15 minutes. The temperature of the cross-linking solution is preferably in the range of 10 to 80° C.

The cross-linking step can also be conducted simultaneously with the dyeing step by blending a cross-linking agent in a dyeing solution. Further, the cross-linking step and the uniaxial stretching step may be carried out simultaneously.

The resultant cross-linked film is usually washed, and then dried (the above-described step (e')). Washing can be carried out by immersing a cross-linked film into pure water such as ion exchanged water and distilled water. The water-washing temperature is usually in the range of 3 to 50° C., preferably 4° C. to 20° C. The immersing time is usually 2 to 300 seconds, preferably 3 seconds to 240 seconds. In the washing step, a washing treatment with an iodide solution and a water-washing treatment may be combined, and a solution prepared by appropriately blending a liquid alcohol such as methanol, ethanol, isopropyl alcohol, butanol, and propanol may also be used.

As the drying method, any suitable methods (for example, natural drying, blast drying, and heat drying) can be adopted. For example, in the case of heat drying, the drying temperature is usually 20 to 95° C. and the drying time is usually about 1 to 15 minutes.

<Production Method of Polarizing Plate>

Figure 5:
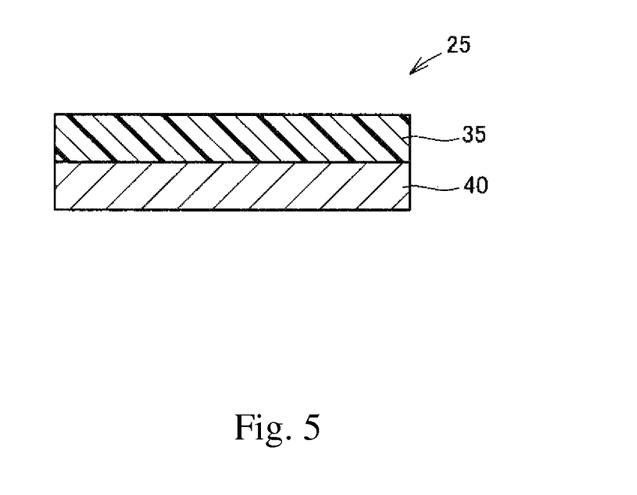
FIG. 5 is a schematic cross-sectional view illustrating one preferable example of a polarizing plate obtained by the method of the present invention.

The above-described polarizing stretched film of the present invention is useful as an intermediate for producing a polarizing plate laminated with a protective film, and by using this, a desirable polarizing plate can be efficiently produced with high yield. As illustrated in FIG. 5, a polarizing plate 25 obtained by the production method of the present invention has a constitution comprising a protective film laminated on one surface of a polarizer layer 35, and has no base film. The polarizing plate obtained by the production method of the present invention is thin and excellent in a polarizing performance and durability. A liquid crystal display device using the polarizing plate according to the present invention shows high contrast ratio.

The polarizing plate can be fabricated using the above-described polarizing stretched film of the present invention by a method including the following steps:

(A) A step of laminating a protective film on a surface of the polarizer layer, wherein the surface is located opposite from the base film of the polarizing stretched film.

(B) A step of peeling and removing the base film.

The protective film used in the above-described step (A) includes films composed of polyolefin resins such as linear polyolefin resins (polypropylene resin, etc.), and cyclic polyolefin resins (Norborne resin, etc.); cellulose ester resin films composed of resins such as cellulose triacetate, and cellulose diacetate; polyester resin films composed of resins such as polyethylene terephthalate, polyethylene naphthalate, and polybutylene terephthalate, polycarbonate resin films, acrylic resin films, or the like.

As the cyclic polyolefin resin, suitable commercially available products, for example, "Topas" (produced by TOPAS ADVANCED POLYMERS GmbH, available from Polyplastics Co., Ltd.), "ARTON" (produced by JSR), "ZEONOR" (produced by Zeon Corporation), "ZEONEX" (produced by Zeon Corporation), and "APEL" (produced by Mitsui Chemicals, Inc.) (all are trade names) can be preferably used.

When such a cyclic polyolefin resin is formed into a film, such known methods as a solvent cast method and a melt extrusion method are appropriately used. Further, commercially available products of formed cyclic polyolefin resin films such as "Escena" (manufactured by Sekisui Chemical Co., Ltd.), "SCA40" (manufactured by Sekisui Chemical Co., Ltd.), and "ZEONOR film" (manufactured by ZEON Corporation) (all are trade names) may be used.

The cyclic polyolefin resin film may have been uniaxially stretched or biaxially stretched. By stretching, the cyclic polyolefin resin film can be endowed with any retardation. Stretching is usually conducted continuously while unwinding a film roll, and stretching is performed toward the moving direction of a roll, toward a direction perpendicular to the movement direction, or toward both the directions, in a heating furnace.

The temperature of the heating furnace is usually in the range from a temperature around the glass transition temperature of the cyclic polyolefin resin up to a temperature 100° C. higher than the glass transition temperature thereof. The draw ratio is usually from 1.1 to 6, preferably from 1.1 to 3.5 for one direction.

Since the cyclic polyolefin resin film is in general poor in surface activity, it is preferable to apply surface treatments such as a plasma treatment, a corona treatment, an ultraviolet irradiation treatment, a flame treatment, and a saponification treatment to the surface to be laminated to a polarizer layer. Out of them, a plasma treatment and a corona treatment, which can be carried out relatively easily, are suitable.

As the cellulose ester resin film, suitable commercially available products, for example, "FUJITAC TD80" (manufactured by FUJIFILM Corporation), "FUJITAC TD80UF" (manufactured by FUJIFILM Corporation), "FUJITAC TD80UZ" (manufactured by FUJIFILM Corporation), "FUJITAC TD40UZ" (manufactured by FUJIFILM Corporation), "KC8UX2M" (manufactured by KONICA MINOLTA OPTO, INC.), and "KC4UY" (manufactured by KONICA MINOLTA OPTO, INC.) (all at trade names) can be suitably used.

On the surface of the cellulose ester resin film, a liquid crystal layer and the like may be formed to improve a view angle property. For the purpose of imparting retardation, a stretched cellulose ester resin film may be used as a protective film. To the cellulose ester resin film, a saponification treatment is usually applied to enhance adhesion to a polarizer layer. As the saponification treatment, methods of immersing into an aqueous solution of an alkali such as sodium hydroxide and potassium hydroxide can be adopted.

Although a thin protective film is preferable, when the thickness is excessively thin, its strength lowers and processability thereof is poor. On the other hand, when the thickness is excessively thick, there occur problems such as lowering of transparency and longer curing time necessary after lamination. Therefore, the thickness of a protective film is preferably 80 µm or less, more preferably 5 to 60 µm. From the standpoint of thinning of a polarizing plate, the total thickness of a polarizer layer and a protective film (namely, the thickness of polarizing plate) is preferably 100 µm or less, more preferably 90 µm or less, further preferably 80 µm or less.

On a surface of a protective film, wherein the surface is opposite to a polarizer film, optical layers such as a hard coat layer, an anti-glare layer, and an anti-reflection layer can also be formed. The method for forming these optical layers on the surface of a protective film is not particularly restricted, and known methods can be used.

Laminating a protective film to a polarizer layer of a polarizing stretched film can be conducted by using an adhesive or a pressure sensitive adhesive. The adhesive includes, for example, aqueous adhesives such as a polyvinyl alcohol resin aqueous solution, and an aqueous two-component urethane emulsion adhesive. In the case of use of a cellulose ester resin hydrophilized by a saponification treatment or the like as a protective film, a polyvinyl alcohol resin aqueous solution is suitably used as the adhesive. The polyvinyl alcohol resin used as the adhesive includes vinyl alcohol homopolymers obtained by saponification of polyvinyl acetate, which is a homopolymer of vinyl acetate, and additionally, vinyl alcohol copolymers obtained by saponification of a copolymer of vinyl acetate and other monomer copolymerizable therewith, and modified polyvinyl alcohol polymers obtained by partial modification of hydroxyl groups of them. To the aqueous adhesive, multivalent aldehydes, water-soluble epoxy compounds, melamine compounds, zirconia compounds, zinc compounds and the like may be added as an additive. In the case of use of the aqueous adhesive, the adhesive layer obtained from this has a thickness of usually 1 µm or less.

The method of laminating a protective film to a polarizer layer using an aqueous adhesive is not particularly restricted and includes, for example, a method in which an adhesive is uniformly applied to the surface of a polarizer layer and/or a protective film before another film is overlapped on the applied surface and laminated by the aid of a roll or the like and dried, wherein the applying method, for example, is a casting method, a Meyer bar coating method, a gravure coating method, a comma coater method, a doctor blade method, a die coating method, a dip coating method, or a spray method. The casting method is a method in which a polarizer layer or a protective film to be coated is moved toward approximately the vertical direction, approximately the horizontal direction or an inclined direction between them and an adhesive is allowed to fall on its surface and spread while moving. Usually, the aqueous adhesive is applied at a temperature of 15 to 40° C. after preparation thereof, and the laminating temperature is usually in the range of 15 to 30° C.

After applying an adhesive, a polarizer layer and a protective film are overlapped, and nipped by nip rolls or the like and laminated. For laminating using nip rolls, for example, a method in which an adhesive is applied, and then, a polarizer layer and a protective film are pressed by a roll or the like to cause its uniform spreading, and a method in which an adhesive is applied, and then, a polarizer layer and a protective film are pressed by passing between a roll and a roll to cause its spreading can be adopted. In the former case, metals, rubbers or the like can be used as the material of the roll. In the latter case, plural rolls may be made of the same material or different materials.

In the case of use of an aqueous adhesive, a laminated film is dried for removing water contained in the aqueous adhesive after laminating a polarizer layer and a protective film. The drying temperature is preferably 30° C. to 90° C. When lower than 30° C., there is a tendency that a polarizer layer and a protective film easily peel off. When 90° C. or higher, there is a possibility of deterioration of a polarizing performance due to heat. The drying time can be 10 to 1000 seconds, and particularly from the standpoint of productivity, is preferably 60 to 750 seconds, further preferably 150 to 600 seconds.

After drying, the laminated film may be cured at room temperature or a somewhat higher temperature than this, for example, a temperature of about 20 to about 45° C. for about 12 to about 600 hours. It is general that the curing temperature is set lower than the temperature adopted in drying.

A photo-curable adhesive can also be used as the adhesive in laminating a polarizer layer and a protective film. The photo-curable adhesive includes, for example, a mixture of a photo-curable epoxy resin and a photocation polymerization initiator.

In the case of use of a photo-curable adhesive, a polarizer layer and a protective film are laminated in the same manner as described above, and then, irradiated with an active energy line to harden the photo-curable adhesive. While the light source of the active energy line is not particularly restricted, active energy lines having emission distribution at a wavelength of 400 nm or less are preferable, and specifically, a low pressure mercury lamp, a medium pressure mercury lamp, a high pressure mercury lamp, an ultrahigh pressure mercury lamp, a chemical lamp, a black light lamp, a microwave excited mercury lamp, a metal halide lamp and the like are preferably used.

The irradiation intensity on the photo-curable adhesive is appropriately determined by the composition of the photo-curable adhesive and is not particularly restricted, and preferably, the irradiation intensity in a wavelength region effective for activating a polymerization initiator is 0.1 to 6000 mW/cm$^2$. When the irradiation intensity is 0.1 mW/cm$^2$ or more, the reaction time is not excessively long, and when 6000 mW/cm$^2$ or less, there is little possibility of occurrence of yellowing of an epoxy resin and deterioration of a polarizer layer due to heat radiated from the light source and due to generating heat during the hardening of the photo-curable adhesive. The irradiation time on the photo-curable adhesive is applied according to the photo-curable adhesive to be hardened and is not particularly restricted, however, the accumulated light quantity expressed by the product of the above-described irradiation intensity and the irradiation time is preferably set to 10 to 10000 $mJ/cm^2$.

When the accumulated light quantity on the photo-curable adhesive is 10 $mJ/cm^2$ or more, an active species derived from a polymerization initiator can be generated in the sufficient amount and the hardening reaction can be surely progressed, and when 10000 $mJ/cm^2$ or less, the irradiation time is not excessively long and excellent productivity can be maintained. The thickness of the adhesive layer after hardening is usually about 0.001 to about 5 µm, preferably 0.01 µm to 2 µm, further preferably 0.01 to 1 µm.

In the case of hardening the photo-curable adhesive by irradiation with an active energy line, it is preferable to conduct hardening under conditions under which various functions of a polarizing plate such as the degree of polarization of a polarizer layer, transmission and hue thereof, and transparency of a protective film do not deteriorate.

In laminating a polarizer layer and a protective film, surface treatments such as a plasma treatment, a corona treatment, an ultraviolet irradiation treatment, a flame treatment, and a saponification treatment may be applied if necessary to the adhesion surface of the polarizer layer and/or the protective film, for improving adhesiveness.

As the saponification treatment, methods of immersing into an aqueous solution of an alkali such as sodium hydroxide and potassium hydroxide are noted.

On the other hand, the pressure sensitive adhesive to be used for the laminating of a protective film and a polarizer layer is usually composed of a composition obtained by adding a cross-linking agent such as an isocyanate compound, an epoxy compound and an aziridine compound to a base polymer such as an acrylic resin, a styrene resin, and a silicone resin. Further, by including of fine particles, a pressure sensitive adhesive layer can also show light scattering property.

The thickness of the pressure sensitive adhesive layer is preferably 1 to 40 µm, and its thinner formation is preferable so long as its processability, durability and the like are not lost, and the thickness is more preferably 3 to 25 µm. A thickness of 3 to 25 µm is suitable for obtaining good processability and for restraining dimension change of a polarizer layer. When the thickness of the pressure sensitive adhesive layer is less than 1 µm, pressure sensitive adhesiveness lowers and when over 40 µm, troubles such as protrusion of the pressure sensitive adhesive tend to occur.

The method of laminating a protective film and a polarizer layer with a pressure sensitive adhesive is not particularly restricted, and it is permissible that a solution containing components typically including the base polymer as described above (pressure sensitive adhesive composition) is applied to the surface of a protective film or on the surface of a polarizer layer and dried to form a pressure sensitive adhesive layer before the protective film and the polarizer layer are laminated, or it is permissible that a pressure sensitive adhesive layer is formed on a separator (peeling film), and then, transferred to the surface of a protective film or the surface of a polarizer layer before the protective film and the polarizer layer are laminated.

In laminating a polarizer layer and a protective film via a pressure sensitive adhesive layer, a surface treatment such as a corona treatment may be applied if necessary to the laminating surface of the polarizer layer and/or the protective film or to one surface or both surfaces of the pressure sensitive adhesive layer, for improving adhesion.

The above-described step (B) is a step of peeling and removing a base film from a laminate having base film/polarizer layer/protective film obtained in the step (A). The method of peeling the base film is not particularly restricted and the peeling can be carried out in the same manner as for a peeling step of a separator (peeling film) conducted on a usual polarizing plate with an adhesive. After laminating a protective film, a base film may be peeled immediately thereafter, or after laminating a protective film, the laminate is wound in a form of roll temporarily, and then it is re-wound in the subsequent step during which a base film may be peeled.

On the polarizing plate produced as described above, other optical layers may be laminated in actual use. The above-described protective film may have functions of these optical layers. The other optical layers include a reflective polarizing film which permits transmission of a certain kind of polarization light and reflects a polarization light capable of showing the nature opposite to this, a film with an antiglare function having uneven surface, a film with a surface antireflection function; a reflection film having a reflection function on its surface; a semi-transmission reflection film having a reflection function and a transmission function together and a view angle compensation film.

Commercially available products corresponding to the reflective polarizing film which permits transmission of a certain kind of polarization light and reflects a polarization light capable of showing the nature opposite to this include, for example, "DBEF" (manufactured by 3M, available from Sumitomo 3M Limited) and "APF" (manufactured by 3M, available from Sumitomo 3M Limited). The view angle compensation film includes an optical compensation film in which a liquid crystalline compound has been applied on the surface of a base material and oriented, a retardation film made of a polycarbonate resin, and a retardation film made of a cyclic polyolefin resin. Commercially available products corresponding to the optical compensation film in which a liquid crystalline compound has been applied on the surface of a base material and oriented include "WV film" (manufactured by FUJIFILM Corporation), "NH film" (manufactured by Nippon Oil Corporation), and "NR film" (manufactured by Nippon Oil Corporation). Commercially available products corresponding to the retardation film made of a cyclic polyolefin resin include "ARTON film" (manufactured by JSR), "Escena" (manufactured by Sekisui Chemical Co., Ltd.), and "ZEONOR film" (manufactured by Optes, Inc.).

<Liquid Crystal Display Device>

The liquid crystal display device of the present invention is characterized by having the polarizing stretched film or the polarizing plate described above. Specifically, the liquid crystal display device of the present invention contains a liquid crystal panel having a liquid crystal cell and the polarizing stretched film or the polarizing plate described above laminated on one surface (may be visual side or rear side) or both surfaces of the liquid crystal cell. As the liquid crystal cell, conventionally known cells of various driving modes can be used. The liquid crystal display device of the present invention may have a conventionally known constitution excepting that it has the polarizing stretched film or the polarizing plate described above. The liquid crystal display device of the present invention is designed to have thinner thickness, and shows high contrast ratio ascribable to excellent polarizing performances of the polarizing stretched film or the polarizing plate.

EXAMPLES

The present invention will be illustrated further specifically by examples given below, but the present invention is not limited to these examples.
[Fabrication of Stretched Film]

Example 1

(1) Fabrication of Base Film

A three-layer base film comprising resin layers made of a homopolypropylene ("Sumitomo Noblen FLX80E4" produced by Sumitomo Chemical Co., Ltd., melting point Tm=163° C.) as a homopolymer of propylene disposed on both sides of a resin layer made of a propylene/ethylene random copolymer ("Sumitomo Noblen W151" produced by Sumitomo Chemical Co., Ltd., melting point Tm=138° C.) containing ethylene units in a proportion of about 5 wt % was fabricated by co-extrusion molding using a multi-layer extrusion molding machine. The prepared base film had a total thickness of 90 μm, and the thickness ratio of layers (FLX80E4/W151/FLX80E4) was 3/4/3.

(2) Formation of Primer Layer

A polyvinyl alcohol powder ("Z-200" produced by The Nippon Synthetic Chemical Industry Co., Ltd., average degree of polymerization: 1100, average degree of saponification: 99.5 mol %) was dissolved in hot water of 95° C. to prepare an aqueous polyvinyl alcohol solution having a concentration of 3 wt %. A cross-linking agent ("Sumilese resin 650" produced by Sumitomo Chemical Co., Ltd.) was mixed with the resultant aqueous solution, in an amount of 5 parts by weight of the agent with respect to 6 parts by weight of the polyvinyl alcohol powder.

The resultant mixed aqueous solution was applied to a corona-treated surface of the above-described base film using a micro gravure coater, and dried at 80° C. for 10 minutes to form a primer layer having a thickness of 0.2 μm.

(3) Formation of Polyvinyl Alcohol Resin Layer

A polyvinyl alcohol powder ("PVA124" produced by Kuraray Co., Ltd., average degree of polymerization: 2400, average degree of saponification: 98.0 to 99.0 mol %) was dissolved in hot water of 95° C. to prepare an aqueous polyvinyl alcohol solution having a concentration of 8 wt %. The resultant aqueous solution was applied to the above-described primer layer using a lip coater, and dried at 80° C. for 2 minutes, at 70° C. for 2 minutes, then, at 60° C. for 4 minutes, to fabricate a three-layer laminated film composed of base film/primer layer/polyvinyl alcohol resin layer. The polyvinyl alcohol resin layer had a thickness of 9.8 μm.

(4) Fabrication of Stretched Film

The above-described laminated film was subjected to free-end longitudinal uniaxial stretching of 5.8 times at a stretching temperature of 160° C., to obtain a stretched film. The resultant stretched film had a thickness of 28.5 μm, and the polyvinyl alcohol resin layer had a thickness of 4.2 μm.

Example 2

A stretched film was fabricated in the same manner as in Example 1, excepting use of a three-layer base film comprising resin layers made of a homopolypropylene ("Sumitomo Noblen FLX80E4" produced by Sumitomo Chemical Co., Ltd., melting point Tm=163° C.) as a homopolymer of propylene disposed on both sides of a resin layer made of a linear low density polyethylene ("FV401" produced by Sumitomo Chemical Co., Ltd., melting point Tm=119° C.) as a homopolymer of ethylene. The resultant base film had a total thickness of 90 μm, and the thickness ratio of layers (FLX80E4/FV401/FLX80E4) was 3/4/3.

Example 3

A stretched film was fabricated in the same manner as in Example 1, excepting use of a two-layer base film comprising a resin layer made of a homopolypropylene ("Sumitomo Noblen FLX80E4" produced by Sumitomo Chemical Co., Ltd., melting point Tm=163° C.) as a homopolymer of propylene disposed on one side of a resin layer made of a linear low density polyethylene ("FV441-0" produced by Sumitomo Chemical Co., Ltd., melting point Tm=111° C.) as a homopolymer of ethylene. The resultant base film had a total thickness of 90 μm, and the thickness ratio of layers (FV441-0/FLX80E4) was 4/6. The polyvinyl alcohol resin layer was formed on the resin layer made of polyethylene.

Comparative Example 1

A laminated film having a thickness of 95 μm was fabricated in the same manner as in Example 1, excepting use of a single-layer base film made of a homopolypropylene ("Sumitomo Noblen FLX80E4" produced by Sumitomo Chemical Co., Ltd., melting point Tm=163° C.). Then, the film was subjected to free-end longitudinal uniaxial stretching under the same conditions as in Example 1, to obtain a stretched film having a thickness of 30.1 μm. The thickness of the polyvinyl alcohol resin layer in the stretched film was 4.5 μm.

Comparative Example 2

A laminated film having a thickness of 95 μm was fabricated in the same manner as in Example 1, excepting use of a single-layer base film made of a propylene/ethylene random copolymer ("Sumitomo Noblen W151" produced by Sumitomo Chemical Co., Ltd., melting point Tm=138° C.) containing ethylene units in a proportion of about 5 wt %. Then, the film was subjected to free-end longitudinal uniaxial stretching under the same conditions as in Example 1, to obtain a stretched film having a thickness of 30.1 μm. The thickness of the polyvinyl alcohol resin layer in the stretched film was 4.5 μm.

(Measurement of Tear Strength of Stretched Film)

The tear strength of the stretched film obtained in the examples and the comparative examples described above was measured by the following method. First, a notch line was made parallel to the stretching direction from the center of the shorter side of the stretched film (the center of the film width) using a cutter. Next, the stretched film was torn from the base point of this notch line using a universal tensile tester ("Autograph AG-I" manufactured by Shimadzu Corp.), and the tear strength in this operation was measured using the same apparatus. Tearing speed of the film was 300 mm/min. In this measurement, tear strength at each torn distance (distance of torn film from the base point of the notch line) is obtained. However, in measurement of tear strength using a tensile tester, a higher tear strength value is often measured until reaching to certain torn distance where the tearing angle of the film steadies. Accordingly, in this measurement, this portion was excluded, and the average value of tear strength in a region in which the tearing strength was stable was measured and used as the tear strength. The results are shown in Table 1.

TABLE 1

| | Base film | | | Tear strength (N) |
|---|---|---|---|---|
| | Number of resin layers | Kind of resin layers | Thickness ratio of resin layers | |
| Example 1 | 3 | FLX80E4/W151/FLX80E4 | 3/4/3 | 0.138 |
| Example 2 | 3 | FLX80E4/FV401/FLX80E4 | 3/4/3 | 0.175 |
| Example 3 | 2 | FV441-0/FLX80E4 | 4/6 | 0.086 |
| Comparative Example 1 | 1 | FLX80E4 | — | 0.040 |
| Comparative Example 2 | 1 | W151 | — | 0.046 |

As shown in Table 1, it was confirmed that the stretched films in Examples 1 to 3 had higher resistance against tearing to the stretching direction as compared with Comparative Examples 1 and 2.

[Fabrication of Polarizing Stretched Film]

Example 4

Polarizing stretched films were fabricated according to the following procedure using the stretched films obtained in Examples 1 to 3. First, the stretched films were immersed in a hot bath of 60° C. for 60 seconds, then, immersed for about 150 seconds in a dyeing solution of 30° C. as an aqueous solution containing iodine and potassium iodide of 30° C. to effect dyeing the polyvinyl alcohol resin layer, and then, excess iodine liquid was washed off with pure water of 10° C. Next, the films were immersed for 600 seconds in a cross-linking solution of 76° C. as an aqueous solution containing boron and potassium iodide. Thereafter, the films were washed with pure water of 10° C. for 4 seconds, and finally, dried at 50° C. for 300 seconds, to obtain polarizing stretched films.

In all cases using the stretched films of Examples 1 to 3, troubles such as tearing of the stretched film did not occur in each step until fabrication of the polarizing stretched film and the polarizing stretched film was able to fabricated stably.

[Fabrication of Polarizing Plate]

Example 5

A polarizing plate was fabricated according to the following procedure using the polarizing stretched film obtained in Example 4. First, a polyvinyl alcohol powder ("KL-318" produced by Kuraray Co., Ltd., average degree of polymerization: 1800) was dissolved in hot water of 95° C., to prepare a polyvinyl alcohol aqueous solution having a concentration of 3 wt %. A cross-linking agent ("Sumilese Resin 650" produced by Sumitomo Chemical Co., Ltd.) was mixed with the resultant aqueous solution, in an amount of 1 part by weight of the agent with respect to 2 parts by weight of the polyvinyl alcohol powder, to give an adhesive solution.

Next, the above-described adhesive solution was applied to the polyvinyl alcohol resin layer of the polarizing stretched film obtained in Example 4, then, a protective film made of triacetylcellulose (TAC) ("KC4UY" manufactured by KONICA MINOLTA OPTO, INC.) was laminated, to obtain a five-layer polarizing plate composed of protective film/adhesive layer/polarizer layer/primer layer/base film. The base film was peeled from the resultant polarizing plate, to fabricate a four-layer polarizing plate composed of protective film/adhesive layer/polarizer layer/primer layer. The base film was able to be peeled easily.

DESCRIPTION OF MARKS 10,100: stretched film
10': laminated film
15: polarizing stretched film
20,200: uniaxially stretched base film
20': base film
21,21',210: first resin layer
22,22',220: second resin layer
25: polarizing plate
30,300: uniaxially stretched polyvinyl alcohol resin layer
30': polyvinyl alcohol resin layer
35: polarizer layer
40: protective film
230: third resin layer

The invention claimed is:

1. A stretched film obtained by uniaxially stretching a laminated film which comprises a base film and a polyvinyl alcohol resin layer laminated on one surface of said base film,
   wherein the base film has a multilayer structure of resin layers including two resin layers which comprise different resins from one another,
   wherein the resins constituting said two resin layers have different phase transition temperatures from one another,
   wherein the phase transition temperature means glass transition temperature when the resin constituting the resin layer is an amorphous resin, and
   wherein phase transition temperature means melting point when the resin is a crystalline resin,
   wherein the resin layer having lower phase transition temperature is not uniaxially oriented,
   wherein said base film is the one stretched perpendicular to the stretching direction of said uniaxial stretching within the plane of the film.

2. The stretched film according to claim 1, wherein the difference between the highest phase transition temperature and the lowest phase transition temperature among the phase transition temperatures of the resins constituting the resin layers in said base film is 10° C. or more.

3. The stretched film according to claim 1, wherein said base film consists of three resin layers.

4. The stretched film according to claim 3, wherein any adjacent resin layers in the three resin layers comprise different resins from one another.

5. The stretched film according to claim 4, wherein the phase transition temperature of the resin constituting the intermediate layer of the three layers is lower than those of the resins constituting other resin layers.

6. The stretched film according to claim 1, wherein said two resin layers comprise linear polyolefin resins having different melting points from one another.

7. The stretched film according to claim 1, wherein the thickness of said polyvinyl alcohol resin layer in the stretched film is 10μm or less.

8. The stretched film according to claim 1, wherein the draw ratio of said laminated film is more than 5.

9. A polarizing stretched film in which the polyvinyl alcohol resin layer in the stretched film is a polarizer layer in which dichroic dye has been adsorbed and oriented in the polyvinyl alcohol resin layer, wherein the stretched film is obtained by uniaxially stretching a laminated film which comprise a base film and the polyvinyl alcohol resin layer laminated on one surface of said base film, wherein the base film has a multilayer structure of resin layers including two resin layers which comprise different resin from one another, wherein the resins constituting said two resin layers have different phase transition temperatures from one another, wherein the phase transition temperature means glass transition temperature when the resin constituting the resin layer is an amorphous resin and, wherein phase transition temperature means melting point when the resin is a crystalline resin, wherein the resin layer having lower phase transition temperature is not uniaxially oriented.

10. A liquid crystal display device comprising a liquid crystal cell and the polarizing stretched film defined in claim 9, wherein said polarizing stretched film is laminated on at least one surface of said liquid crystal cell.

\* \* \* \* \*